United States Patent
Moriya et al.

(10) Patent No.: US 7,678,017 B2
(45) Date of Patent: Mar. 16, 2010

(54) SHIFT CONTROL DEVICE AND RATIO CONTROL METHOD FOR AUTOMATIC TRANSMISSION

(75) Inventors: Naoto Moriya, Toyota (JP); Masaharu Tanaka, Toyota (JP); Yoshio Hasegawa, Chiryu (JP); Tomohiro Asami, Nissin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 127 days.

(21) Appl. No.: 12/153,112

(22) Filed: May 14, 2008

(65) Prior Publication Data
US 2008/0287258 A1    Nov. 20, 2008

(30) Foreign Application Priority Data
May 15, 2007   (JP)   ............................. 2007-129243

(51) Int. Cl.
*F16H 59/00* (2006.01)
(52) U.S. Cl. .................. 477/127; 477/130; 477/156
(58) Field of Classification Search .................. 477/115, 477/127, 130, 156, 163, 164
See application file for complete search history.

(56) References Cited

U.S. PATENT DOCUMENTS

| | | | | |
|---|---|---|---|---|
| 6,375,597 | B1 * | 4/2002 | Popp et al. | 477/97 |
| 6,413,189 | B1 * | 7/2002 | Spiess et al. | 477/110 |
| 6,926,640 | B2 * | 8/2005 | Iwamoto et al. | 477/175 |
| 7,056,264 | B2 * | 6/2006 | Kupper et al. | 477/180 |

FOREIGN PATENT DOCUMENTS

| | | |
|---|---|---|
| JP | 04-366066 A | 12/1992 |
| JP | 08-210483 A | 8/1996 |
| JP | 08-247275 A | 9/1996 |
| JP | 2005-036934 A | 2/2005 |
| JP | 2005-048783 A | 2/2005 |

* cited by examiner

*Primary Examiner*—Ha D. Ho
(74) *Attorney, Agent, or Firm*—Sughrue Mion, PLLC

(57) ABSTRACT

In a shift control device and a shift control method for an automatic transmission, when the shift range is switched from a non-travel range to a travel range, a squat control of temporarily forming a high-speed step that is smaller in speed change ratio than the first speed change step by engaging a first engagement element and a second engagement element, and then forming the first speed change step by releasing the second engagement element. In the case of standing-start of the vehicle in the high-speed step, the squat control is ended before the first speed change step is formed by releasing the second engagement element.

4 Claims, 10 Drawing Sheets

FIG. 3

|      | C1  | C2  | C3  | C4  | B1  | B2  | F1  |
|------|-----|-----|-----|-----|-----|-----|-----|
| P    |     |     |     |     |     |     |     |
| Rev1 |     |     | O   |     |     | O   |     |
| Rev2 |     |     |     | O   |     | O   |     |
| N    |     |     |     |     |     |     |     |
| 1st  | O   |     |     |     |     | (O) | O   |
| 2nd  | O   |     |     | O   |     |     |     |
| 3rd  | O   |     | O   |     |     |     |     |
| 4th  | O   |     |     | O   |     |     |     |
| 5th  | O   | O   |     |     |     |     |     |
| 6th  |     | O   |     | O   |     |     |     |
| 7th  |     | O   | O   |     |     |     |     |
| 8th  |     | O   |     |     | O   |     |     |

O ENGAGED
(O) ENGAGED ONLY DURING ENGINE BRAKE

SHIFT CONTROL DEVICE AND RATIO CONTROL METHOD FOR AUTOMATIC TRANSMISSION

INCORPORATION BY REFERENCE

The disclosure of Japanese Patent Application No. 2007-129243 filed on May 15, 2007, including the specification, drawings and abstract is incorporated herein by reference in its entirety.

BACKGROUND OF THE INVENTION

1. Field of the Invention

The invention relates to a shift control device and a shift control method for an automatic transmission. Particularly, the invention relates to a shift control device and a shift control method for an automatic transmission that execute a squat control.

2. Description of the Related Art

There is a known related-art shift control device of an automatic transmission of the aforementioned type that performs a squat control of forming the first speed change step after temporarily forming a speed change step other than the first speed change step so as to reduce the speed change step shifting shock when the select range is switched from the N range to a travel range (see, for example, Japanese Patent Application Publication No. 4-366066 (JP-A-4-366066)).

Another known shift control device of an automatic transmission is a device that performs a shift control of an automatic transmission as shown in FIG. 10 (see, for example, Japanese Patent Application Publication No. 2005-36934 (JP-A-2005-36934)). In the case where the automatic transmission is switched from the neutral state to a state in which the second speed change step that is less in speed change ratio than the first speed change step is established, this shift control device of the automatic transmission sequentially engages a fourth clutch C4 and a third brake B3 for forming the second speed change step subsequently to the engagement of the first clutch C1 for forming the first speed change step so as to reduce the speed change step shifting shock even when the vehicle is started from the standing state in the second speed change step.

However, in the case where the squat control described in Japanese Patent Application Publication No. 4-366066 (JP-A-4-366066) is performed by the shift control device of the automatic transmission described in Japanese Patent Application Publication No. 2005-36934 (JP-A-2005-36934), the switching of the automatic transmission from the neutral state to the state in which the second speed change step is established is performed by sequentially engaging the first clutch C1 and the fourth clutch C4, and engaging a second brake B2 capable of fine control of capacity, and releasing the second brake B2, and then engaging the third brake B3 capable of withstanding the torque occurring at the time of the standing-start. Therefore, the speed change step shifts from the second speed change step to the first speed change step, and then the second speed change step is formed again. Hence, there is a problem of occurrence of a speed change step shift shock.

SUMMARY OF THE INVENTION

The invention is accomplished in view of the foregoing problems of the related art. In the shift control device and the shift control method for an automatic transmission which perform a squat control, the invention provides a shift control device and a shift control method for an automatic transmission capable of preventing the occurrence of a speed change step shift shock even in the case where the vehicle is started from the standing state in a high speed step that is smaller in speed change ratio than the first speed change step.

According to one aspect of the invention, there is provided a shift control device for an automatic transmission which includes a squat control device that, when a shift range is switched from a non-travel range to a travel range, performs a squat control of temporarily forming a high-speed step that is smaller in speed change ratio than a first speed change step by engaging a first engagement element and a second engagement element, and then forming the first speed change step by releasing the second engagement element. The shift control device also includes a squat control end device that, in a case of standing-start of a vehicle in the high-speed step, ends the squat control performed by the squat control device, before the first speed change step is formed by releasing the second engagement element.

According to another aspect of the invention, there is provided a shift control method for an automatic transmission. This shift control method includes:

performing, when a shift range is switched from a non-travel range to a travel range, a squat control of temporarily forming a high-speed step that is smaller in speed change ratio than a first speed change step by engaging a first engagement element and a second engagement element, and then forming the first speed change step by releasing the second engagement element; and ending, in a case of standing-start of a vehicle in the high-speed step, the squat control performed, before the first speed change step is formed by releasing the second engagement element.

According to the shift control device and the shift control method for an automatic transmission described above, in the case of standing-start of the vehicle in a high-speed step that is smaller in speed change ratio than the first speed change step, after the high-speed step is temporarily formed by engaging the first engagement element and the second engagement element, the squat control is ended before the first speed change step is formed by releasing the second engagement element. Therefore, it does not happen that the formation of the speed change step shifts from the high-speed step to the first speed change step and then back to the high-speed step, but a state in which the high-speed step is first formed can be retained. Therefore, even in the case where the vehicle is started from the standing state in the high-speed step, the occurrence of a speed change step shift shock can be prevented.

In the foregoing shift control device for the automatic transmission, it is also preferable that the shift control device include a high-speed step standing-start-time setting device that sets an oil pressure command value that serves as a squat control-ending condition in the case of standing-start of the vehicle in the high-speed step, and that the squat control device gradually lessen an oil pressure command value for the second engagement element after the high-speed step is temporarily formed by engaging the first engagement element and the second engagement element, and that, in the case of standing-start of the vehicle in the high-speed step, the squat control end device end the squat control performed by the squat control device when the oil pressure command value for the second engagement element that is gradually lessened by the squat control device becomes less than the oil pressure command value set by the high-speed step standing-start-time setting device.

In the shift control method, it is also preferable to have the following construction. That is, the method further includes:

setting an oil pressure command value that serves as a squat control-ending condition in the case of standing-start of the vehicle in the high-speed step;

gradually lessening an oil pressure command value for the second engagement element after the high-speed step is temporarily formed by engaging the first engagement element and the second engagement element; and ending, in the case of standing-start of the vehicle in the high-speed step, the squat control when the oil pressure command value for the second engagement element that is gradually lessened becomes less than the set oil pressure command value.

It is preferable that the first oil pressure command value be a value of such a magnitude that the second engagement element is not released.

According to the shift control device and the shift control method for the automatic transmission described above, after the high-speed step is temporarily formed by engaging the first engagement element and the second engagement element, the oil pressure command value for the second engagement element is gradually lessened, and then the squat control is ended when the oil pressure command value becomes less than a the oil pressure command value set for the standing-start in the high-speed step. Therefore, the timing of ending the squat control can be minutely set.

In the foregoing shift control device for the automatic transmission, it is also preferable that the shift control device include an ordinary standing-start-time setting device that sets a an oil pressure command value that serves as a squat control-ending condition in the case of standing-start of the vehicle in the first speed change step, and that, in the case of standing-start of the vehicle in the first speed change step, the squat control end device end the squat control performed by the squat control device when the oil pressure command value for the second engagement element that is gradually lessened by the squat control device becomes less than the oil pressure command value set by the ordinary standing-start-time setting device.

In the shift control method for the automatic transmission, it is also preferable to have the following construction. That is, the method further includes:

setting an oil pressure command value that serves as a squat control-ending condition in the case of standing-start of the vehicle in the first speed change step; and ending, in the case of standing-start of the vehicle in the first speed change step, the squat control when the oil pressure command value for the engagement element that is gradually lessened becomes less than the oil pressure command value.

It is also preferable that the set oil pressure command value be a value of such a magnitude that the second engagement element is released.

According to the shift control device and the shift control method for the automatic transmission described above, in the case of standing-start of the vehicle in the first speed change step, the squat control is ended when the oil pressure command value for the second engagement element becomes less than the oil pressure command value set for the ordinary standing-start. Therefore, the squat control can be performed separately for the high-speed step standing-start and the ordinary standing-start.

In the foregoing shift control device and the shift control method for the automatic transmission, it is also preferable that the oil pressure command value be larger than the set oil pressure command value.

With this construction, in the case of standing-start of the vehicle in the high-speed step, the squat control can be ended while the second engagement element remains high. Therefore, the speed change step shift shock associated with the release/re-engagement of the second engagement element can be prevented.

According to the invention, in the shift control device and the shift control method for an automatic transmission which perform the squat control, even in the case where the vehicle is started from the standing state in a high-speed step that is smaller in speed change ratio than the first speed change step, the occurrence of a speed change step shift shock can be prevented.

BRIEF DESCRIPTION OF THE DRAWINGS

The foregoing and further features and advantages of the invention will be better understood by reading the following detailed description of preferred embodiments of the invention, when considered in connection with the accompanying drawings, in which:

FIG. 3 is a diagram showing combinations of actuated hydraulic type friction engagement devices among a plurality of such devices in an automatic transmission and relationships of the combinations with the thereby-established speed change steps in accordance with the embodiment of the invention;

DETAILED DESCRIPTION OF THE EMBODIMENTS

Figure 1:
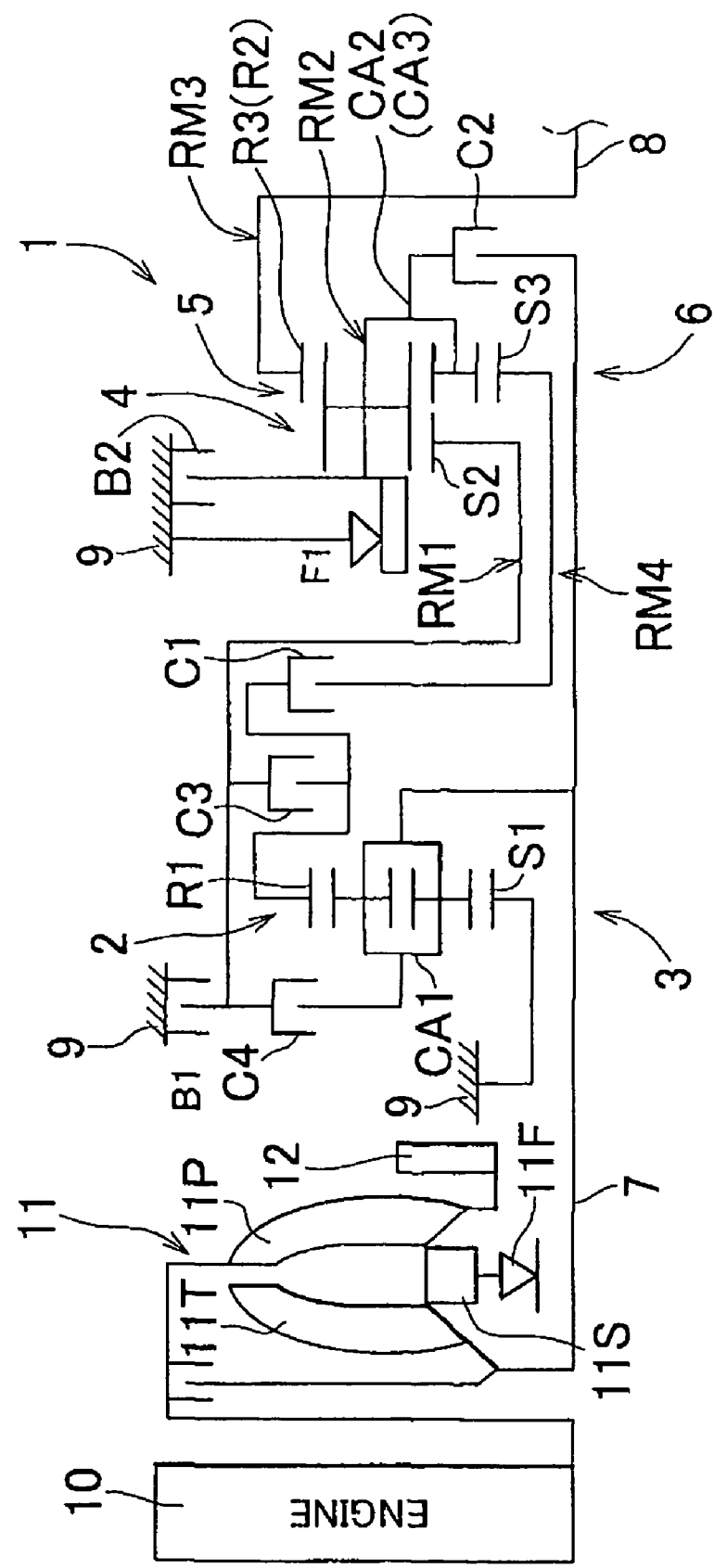
FIG. 1 is a general construction diagram of a vehicle driving device in accordance with an embodiment of the invention.

In the following description and the accompanying drawings, the invention will be described in greater detail with reference to the example embodiments. FIG. 1 is a general construction diagram of a vehicle driving device in accordance with an embodiment of the invention. Firstly, the construction will be described. As shown in FIG. 1, the vehicle driving device is of a type that is suitably adopted in, for example, the longitudinally mounted type FR (front engine, rear wheel drive) vehicles, and is constructed of an engine 10, a torque converter 11, and an automatic transmission 1. The engine 10 is a traveling motive power source constructed by an internal combustion engine. The output of the engine 10 is input to the automatic transmission 1 via the torque converter 11 as a fluid-type power transmission device, and is transmitted to wheels via a differential gear device (not shown) and axle shafts (not shown). The torque converter 11 is constructed of a pump impeller 11P, a turbine runner 11T, a stator 11S that is prevented from rotating in one direction by a one-way clutch 11F, etc.

The automatic transmission 1 includes a first speed change portion 3 constructed mainly of a double-pinion type first planetary gear device 2, and a second speed change portion 6 constructed mainly of a single-pinion type second planetary gear device 4 and a double-pinion type third planetary gear device 5. The two speed change portions are provided within a transmission case (hereinafter, simply termed the case) 9 that is a non-rotating member attached to a vehicle body. The automatic transmission 1 changes the rotation of an input shaft 7 in speed, and outputs the speed-changed rotation from an output shaft 8.

The first planetary gear device 2 constituting the first speed change portion 3 includes three rotating elements, that is, a sun gear S1, a carrier CA1 and a ring gear R1. The sun gear S1 is fixed un-rotatably to the case 9. As the carrier CA1 is linked integrally to the input shaft 7 and is rotatably driven, the ring gear R1 functions as a speed-reduction output member, and reduces the speed of the rotation of the input shaft 7, and outputs the reduced-speed rotation.

The second planetary gear device 4 and the third planetary gear device 5 constituting the second speed change portion 6 include four rotating elements RM1 to RM4. The first rotating element RM1 is constructed of a sun gear S2 of the second planetary gear device 4. The second rotating element RM2 is constructed of a carrier CA2 of the second planetary gear device 4 and a carrier CA3 of the third planetary gear device 5 that are linked to each other. The third rotating element RM3 is constructed of a ring gear R2 of the second planetary gear device 4 and a ring gear R3 of the third planetary gear device 5 that are linked to each other. The fourth rotating element RM4 is constructed of a sun gear S3 of the third planetary gear device 5.

In the second planetary gear device 4 and the third planetary gear device 5, the carrier CA2 and the carrier CA3 are constructed of a common member, and the ring gear R2 and the ring gear R3 are constructed of a common member. Besides, pinions of the second planetary gear device 4 serve also as second pinions of the third planetary gear device 5.

The first rotating element RM1 (sun gear S2) is selectively linked to the case 9 by the first brake B1 so as to stop rotating. Besides, the first rotating element RM1 is selectively linked to the ring gear R1, which is a speed-reducing output member, via a third clutch C3. Furthermore, the first rotating element RM1 is selectively linked to the carrier CA1 of the first planetary gear device 2, that is, the input shaft 7, via a fourth clutch C4.

The second rotating element RM2 (carriers CA2, CA3) is selectively linked to the case 9 by the second brake B2 so as to stop rotating. Besides, the second rotating element RM2 (carriers CA2, CA3) is selectively linked to the input shaft 7 via the second clutch C2.

The third rotating element RM3 (ring gears R2, R3) is linked integrally to the output shaft 8, and rotates together therewith. The fourth rotating element RM4 (sun gear S3) is selectively linked to the ring gear R1 of the first planetary gear device 2, which is a speed-reducing output member, via the first clutch C1. In addition, between the second rotating element RM2 and the case 9, there is provided a one-way clutch F1 that allows normal rotation of the second rotating element RM2 (rotation thereof in the same rotation direction as the input shaft 7) and also prevents reverse rotation thereof. The one-way clutch F1 is provided in parallel with the second brake B2.

Figure 2:
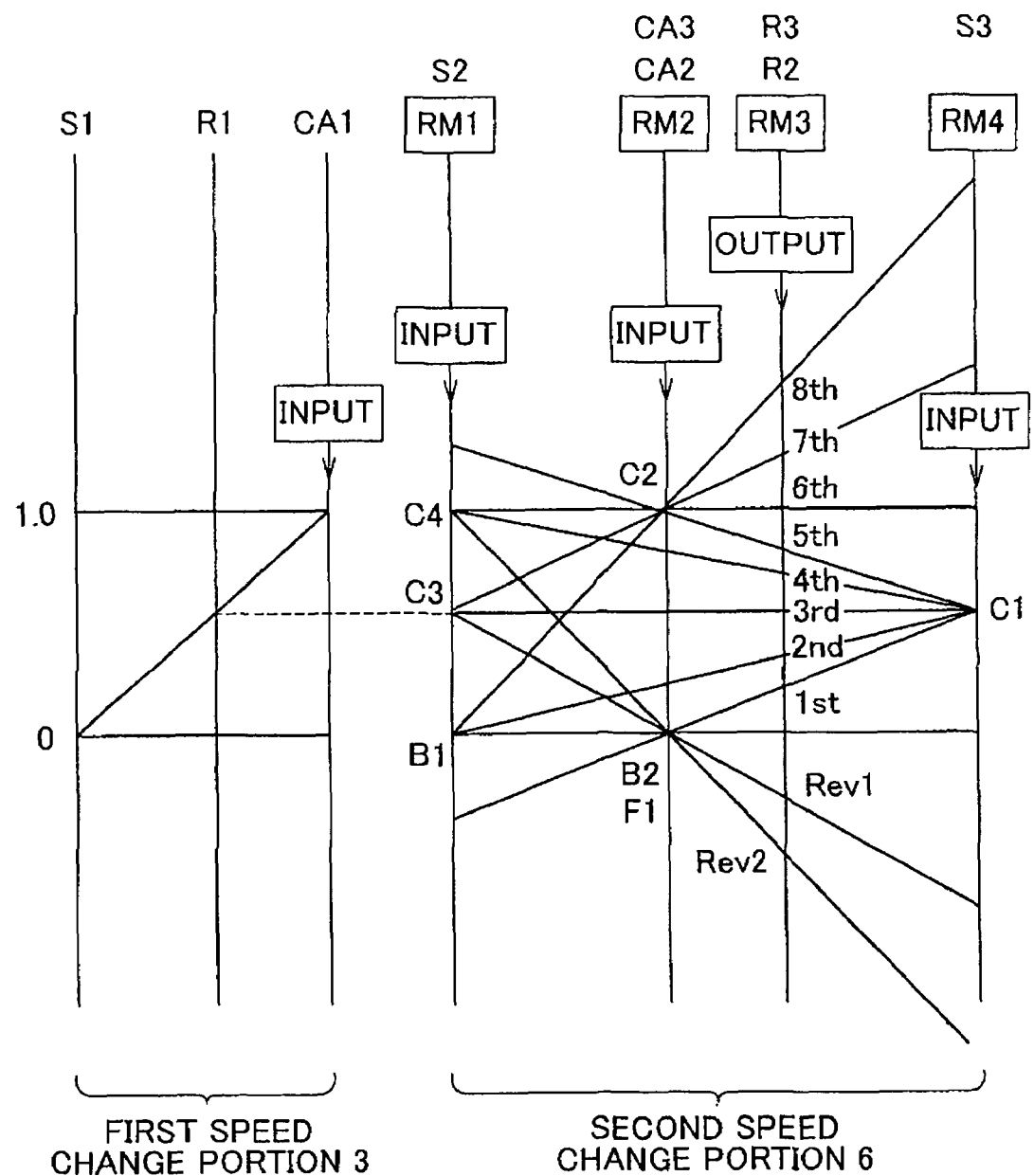
FIG. 2 is an alignment chart showing the rotation speeds of various rotating elements for each speed change step in accordance with the embodiment of the invention.

FIG. 2 is an alignment chart showing rotation speeds of the various rotating elements for each speed change step in accordance with the embodiment of the invention.

In FIG. 2, a lower horizontal line shows a rotation speed of "0", and an upper horizontal line shows a rotation speed of "1", that is, the same rotation speed as that of the input shaft 7. Besides, the vertical lines for the first speed change portion 3 represent the sun gear S1, the ring gear R1 and the carrier CA1 in that order from the left side, and the intervals between the vertical lines have been determined in accordance with the gear ratio ρ1 of the first planetary gear device 2 (=the number of teeth of the sun gear S1/the number of teeth of the ring gear R1). The four vertical lines for the second speed change portion 6 represent the first rotating element RM1 (the sun gear S2), the second rotating element RM2 (the carrier CA2 and the carrier CA3), the third rotating element RM3 (the ring gear R2 and the ring gear R3), and the fourth rotating element RM4 (sun gear S3) in that order from the left side. The intervals between the vertical lines have been determined in accordance with the gear ratio ρ2 of the second planetary gear device 4 and the gear ratio ρ3 of the third planetary gear device 5.

As shown in FIGS. 2 and 3 (the status of actuation of the clutches and the brakes show in FIG. 3 will be later described in detail), when the first clutch C1 and the second brake B2 are engaged, the fourth rotating element RM4 is rotated at reduced speed integrally with the ring gear R1, which is a speed-reducing output member. Besides, the second rotating element RM2 is stopped from rotating, and the third rotating element RM3 linked to the output shaft 8 is rotated at a rotation speed that is shown by "1st". Specifically, the first speed change step "1st" that is the greatest in speed change ratio (=the rotation speed of the input shaft 7/the rotation speed of the output shaft 8) is established.

When the first clutch C1 and the first brake B1 are engaged, the fourth rotating element RM4 and the ring gear R1 are integrally rotated at reduced-speed. Besides, the first rotating element RM1 is stopped from rotating, and the third rotating element RM3 is rotated at a rotation speed shown by "2nd". Specifically, the second speed change step "2nd" that is smaller in speed change ratio than the first speed change step "1st" is established.

When the first clutch C1 and the third clutch C3 are engaged, the second speed change portion 6 is rotated at reduced speed integrally with the ring gear R1, and the third rotating element RM3 is rotated at a rotation speed shown by "3rd" (which is the same as the rotation speed of the ring gear R1). Specifically, the third speed change step "3rd" that is smaller in speed change ratio than the second speed change step "2nd" is established.

When the first clutch C1 and the fourth clutch C4 are engaged, the fourth rotating element RM4 is rotated at reduced speed integrally with the ring gear R1. Besides, the first rotating element RM1 is rotated integrally with the input shaft 7, and the third rotating element RM3 is rotated at a rotation speed shown by "4th". Specifically, the fourth speed change step "4th", smaller in speed change ratio than the third speed change step "3rd", is established.

When the first clutch C1 and the second clutch C2 are engaged, the fourth rotating element RM4 is rotated at reduced speed integrally with the ring gear R1. Besides, the second rotating element RM2 is rotated integrally with the input shaft 7, and the third rotating element RM3 is rotated at a rotation speed shown by "5th". Specifically, the fifth speed change step "5th", smaller in speed change ratio than the fourth speed change step "4th", is established.

When the second clutch C2 and the fourth clutch C4 are engaged, the second speed change portion 6 is rotated integrally with the input shaft 7, and the third rotating element RM3 is rotated at a rotation speed shown by "6th" (which is the same as the rotation speed of the input shaft 7). Specifically, the sixth speed change step "6th", smaller in speed change ratio than the fifth speed change step "5th" is established. The speed change ratio of the sixth speed change step "6th" is 1.

When the second clutch C2 and the third clutch C3 are engaged, the second rotating element RM2 is rotated integrally with the input shaft 7. Besides, the first rotating element RM1 is rotated at reduced speed integrally with the ring gear R1, and the third rotating element RM3 is rotated at a rotation speed shown by "7th". Specifically, the seventh speed change step "7th", smaller in speed change ratio than the sixth speed change step "6th", is established.

When the second clutch C2 and the first brake B1 are engaged, the second rotating element RM2 is rotated integrally with the input shaft 7. Besides, the first rotating element RM1 is stopped from rotating, and the third rotating element RM3 is rotated at a rotation speed shown by "8th". Specifically, the eighth speed change step "8th", smaller in speed change ratio than the seventh speed change step "7th", is established.

Furthermore, when the second brake B2 and the third clutch C3 are engaged, the second rotating element RM2 is stopped from rotating. Besides, the first rotating element RM1 is rotated integrally with the ring gear R1, and the third rotating element RM3 is reversely rotated at a rotation speed shown by "Rev1". Specifically, the first reverse travel speed change step "Rev1" is established.

When the second brake B2 and the fourth clutch C4 are engaged, the second rotating element RM2 is stopped from rotating. Besides, the first rotating element RM1 is rotated integrally with the input shaft 7, and the third rotating element RM3 is reversely rotated at a rotation speed shown by "Rev2". Specifically, the second reverse travel speed change step "Rev2" is established.

FIG. 3 is a diagram showing combinations of actuated hydraulic type friction engagement devices among the plurality of the friction engagement devices in the automatic transmission and relationships of the combinations with the thereby-established speed change steps.

In FIG. 3, the states of actuation of the clutches C1 to C4 and the brakes B1, B2 at the time of establishing the aforementioned speed change steps. Incidentally, the clutches C1 to C4 and the brakes B1, B2 (hereinafter, simply referred to as "clutches C" and "brakes B" if distinction thereof is not particularly made) are hydraulic type friction engagement devices that are engaged and controlled by hydraulic actuators such as multi-disc clutches, brakes, etc.

In FIG. 3, the circles represent the engaged state, and the parenthesized circle represents the engaged state established only during the effect of the engine brake, and the blanks represent the released state. Since the second brake B2 for establishing the first speed change step "1st" is provided in parallel with the one-way clutch F1, the second brake B2 does not altogether need to be engaged at the time of standing-start (at the time of acceleration). Besides, the speed change ratios of the speed change steps are appropriately determined by the gear ratios ρ1, ρ2, ρ3 of the first planetary gear device 2, the second planetary gear device 4 and the third planetary gear device 5, respectively.

Figure 4:
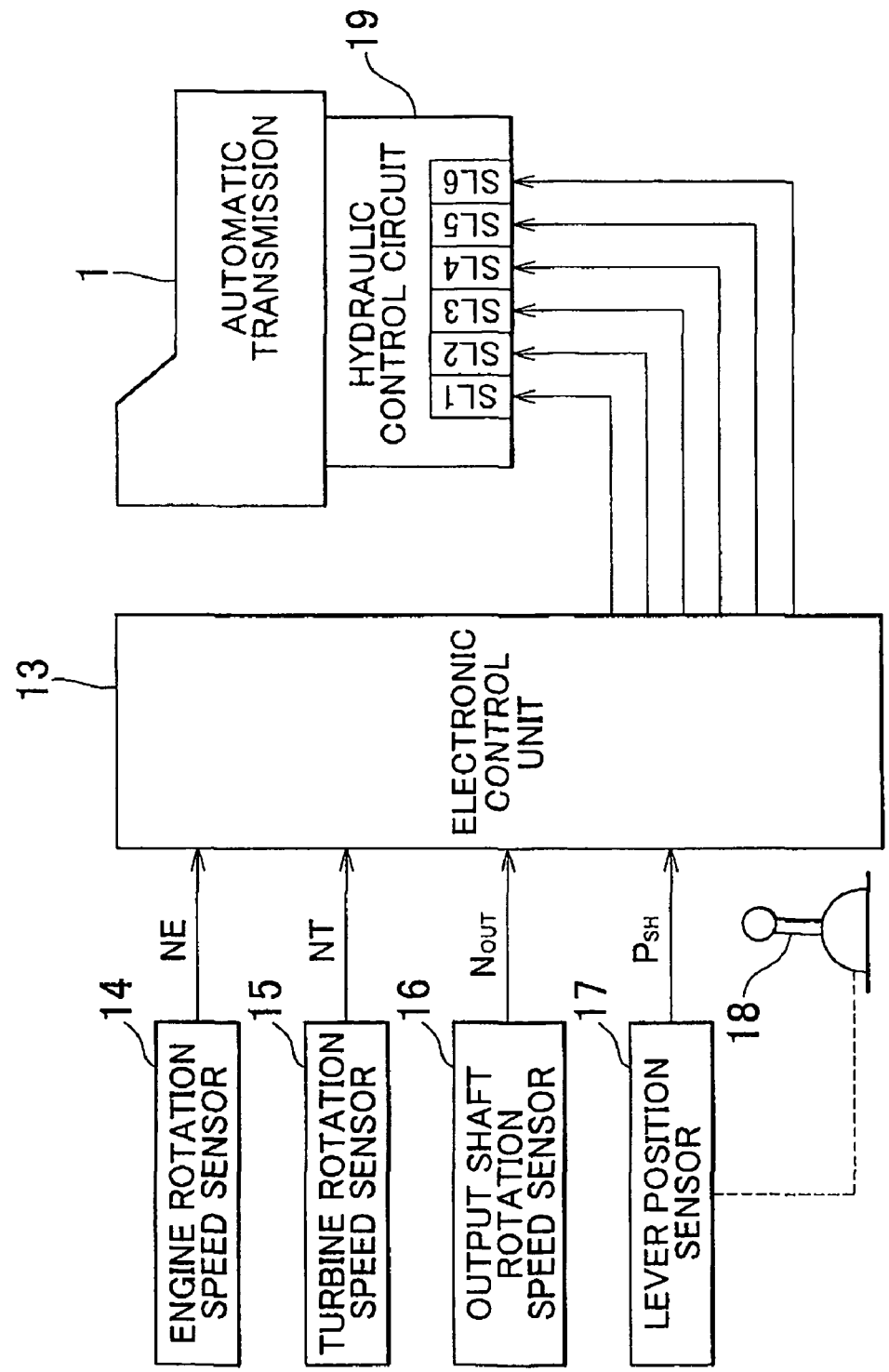
FIG. 4 is a block diagram showing portions of a control system that controls an automatic transmission in accordance with the embodiment of the invention.

FIG. 4 is a block diagram showing portions of a control system that controls the automatic transmission in accordance with the embodiment of the invention.

As shown in FIG. 4, an electronic control unit 13 constitutes a shift control device of an automatic transmission in accordance with the invention, and is constructed by a microcomputer that includes a CPU (Central Processing Unit), a RAM (Random Access Memory), a ROM (Read-Only Memory), an input interface, an output interface, etc. The CPU executes an output control of the engine 10, a shift control of the automatic transmission 1, etc., by performing a signal processing in accordance with a program pre-stored in the ROM while utilizing the temporary storage function of the RAM. In accordance with needs, the CPU is constructed separately for the engine control, the shift control, and the brake control.

The electronic control unit 13 is connected with an engine rotation speed sensor 14, a turbine rotation speed sensor 15, an output shaft rotation speed sensor 16, a lever position sensor 17, etc., via a harness and the like.

The engine rotation speed sensor 14 detects the rotation speed of the engine 10 (hereinafter, referred to as "engine rotation speed") NE, and outputs a signal representing the detected engine rotation speed NE to the electronic control unit 13.

The turbine rotation speed sensor 15 detects the rotation speed NT of the turbine runner 11T of the torque converter 11. The turbine runner 11T is coupled to the input shaft 7 of the automatic transmission 1, and therefore the turbine rotation speed sensor 15 can be said to detect the rotation speed of the input shaft 7 (hereinafter, referred to as "input shaft rotation speed") Nin. The turbine rotation speed sensor 15 also outputs to the electronic control unit 13 a signal representing the detected turbine rotation speed NT, that is, the input shaft rotation speed Nin.

The output shaft rotation speed sensor 16 detects the rotation speed of the output shaft 8 of the automatic transmission 1 (hereinafter, referred to as "output shaft rotation speed") NOUT, and outputs a signal representing the detected output shaft rotation speed NOUT to the electronic control unit 13.

The lever position sensor 17 detects the lever position (operation position) PSH of the shift lever 18, and outputs a signal representing the detected lever position PSH to the electronic control unit 13.

Figure 5:
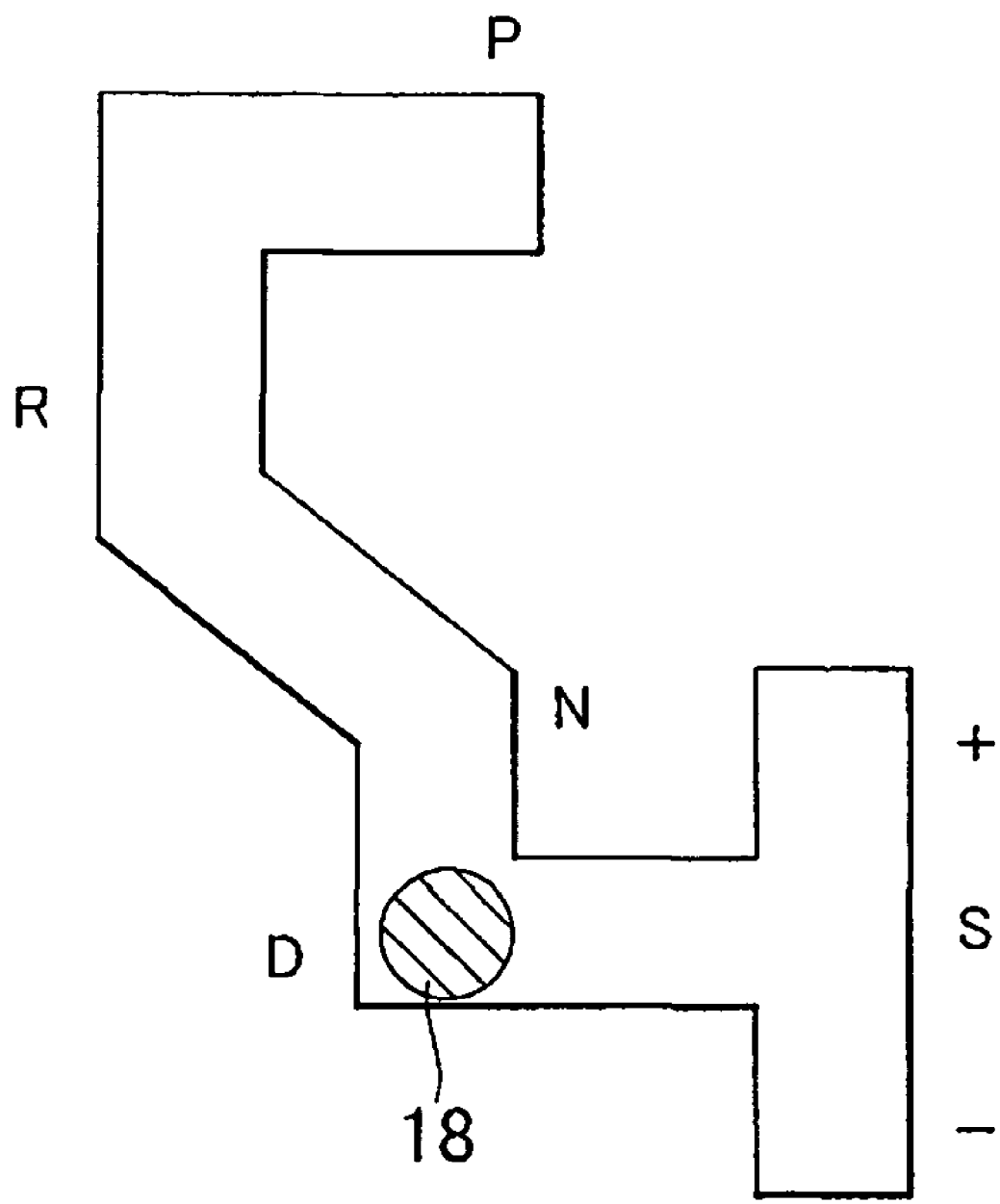
FIG. 5 is a diagram for describing the operation positions of a shift lever in accordance with the embodiment of the invention.

FIG. 5 is a diagram for describing the operation positions of the shift lever in accordance with the embodiment of the invention. As shown in FIG. 5, the shift lever 18 is disposed, for example, near a driver's seat, and is constructed to be manually operated to five lever positions "P", "R", "N", "D" and "S". The "P" position is a parking position for releasing the power transmission path in the automatic transmission 1 and mechanically preventing (locking) rotation of the output shaft via a mechanical parking mechanism. The "R" position is a reverse travel position for setting the rotational direction of the output shaft 8 of the automatic transmission 1 to the reverse rotation direction. The "N" position is a position for releasing the power transmission path in the automatic transmission 1, that is, a power transmission cutoff position for bringing about a neutral state in which the power transmission in the automatic transmission 1 is cut off.

The "D" position is a forward travel position for executing an automatic shift control in a shift range (D range) that allows gear ratio shifts with the first to eighth speeds of the automatic transmission 10. The "S" position is a forward travel position that allows the manual switching between a plurality of different speed change steps. The "S" position is provided with a "+" position for shifting the range of shift or the speed change step to the up-side every time the shift lever 18 is operated to the position, and a "−" position for shifting the range of shift or the speed change step to the down-side every time the shift lever 18 is operated to the position. The lever position sensor 17 detects at which one of the lever positions (operation positions) PSH the shift lever 18 is positioned.

Figure 6:
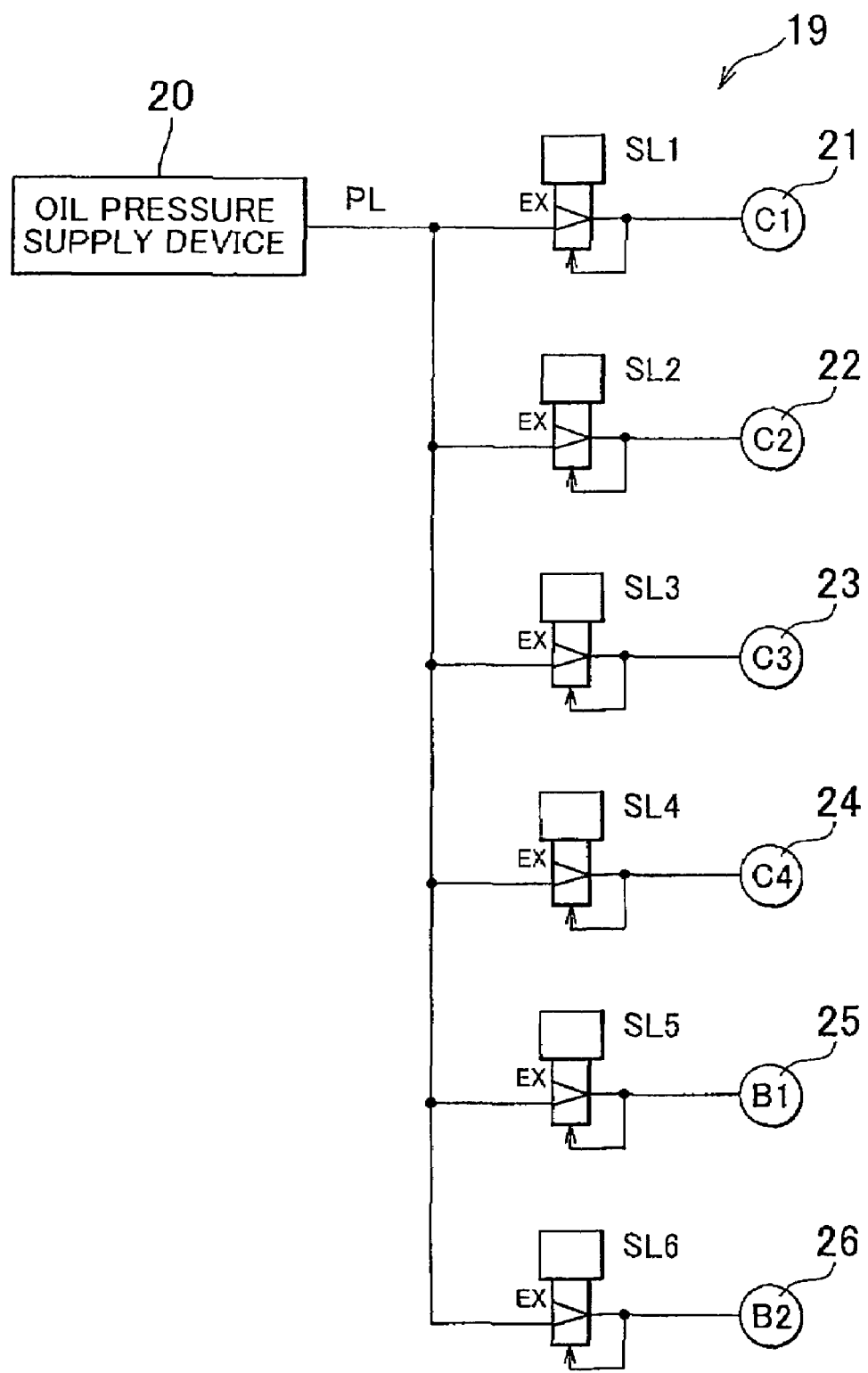
FIG. 6 is a circuit diagram showing portions of a hydraulic control circuit in accordance with the embodiment of the invention.

FIG. 6 is a circuit diagram showing portions of a hydraulic control circuit in accordance with the embodiment of the invention. As shown in FIG. 6, a hydraulic control circuit 19 includes an oil pressure supply device 20, linear solenoid valves SL1 to SL6, hydraulic actuators (hydraulic cylinders) 21 to 26 of the clutches C1 to C4 and the brakes B1, B2. A line oil pressure PL output from the oil pressure supply device 20 is adjusted by the linear solenoid valves SL1 to SL6, and the adjusted oil pressure is supplied therefrom directly to the hydraulic actuators 21 to 26.

The oil pressure supply device 20 includes a mechanical oil pump 12 (see FIG. 1) that is rotationally driven by the engine 10, a regulator valve that adjusts the line oil pressure PL, etc., and controls the line oil pressure PL in accordance with the engine load, and the like. Basically, all the linear solenoid valves SL1 to SL6 have the same construction. Each linear solenoid valve is independently excited or non-excited in accordance with a signal that represents the oil pressure command value from the electronic control unit 13 (see FIG. 4) so as to independently adjust and control the oil pressure of the hydraulic actuators 21 to 26.

The electronic control unit 13 is designed so that in the case where the shift lever 18 has been operated from the "N" position to the "D" position, the electronic control unit 13 temporarily forms the second speed change step that is smaller in speed change ratio than the first speed change step by engaging the first clutch C1 and the first brake B1, and then forms the first speed change step by releasing the first brake B1. That is, the electronic control unit 13 constitutes a squat control device in accordance with the invention.

In the case where the 2nd-speed standing-start mode has been selected, the electronic control unit 13 ends the squat control before the first speed change step is formed by releasing the first brake B1. That is, the electronic control unit 13 constitutes a squat control end device in the invention.

The electronic control unit 13 sets a squat control-ending oil pressure command value PS2 that serves as a squat control-ending condition during the 2nd-speed standing-start mode. That is, the electronic control unit 13 constitutes a high-speed step standing-start-time setting device in the invention.

The electronic control unit 13 sets a squat control-ending oil pressure command value PS1 that serves as a squat control-ending condition during an ordinary standing-start mode. That is, the electronic control unit 13 constitutes an ordinary standing-start-time setting device in the invention. Incidentally, the electronic control unit 13 sets, as the squat control-ending oil pressure command value PS2, a value that is larger than the squat control-ending oil pressure command value PS1.

The electronic control unit 13, after temporarily forming the second speed change step by engaging the first clutch C1 and the first brake B1, gradually lessens the oil pressure command value for the first brake B1. In the case where the 2nd-speed standing-start mode has been selected, the electronic control unit 13 ends the squat control when the oil pressure command value for the first brake B1 becomes less than the squat control-ending oil pressure command value PS2. In the case where the ordinary standing-start mode has been selected, the electronic control unit 13 ends the squat control when the oil pressure command value for the first brake B1 becomes less than the squat control-ending oil pressure command value PS1.

Figure 7:
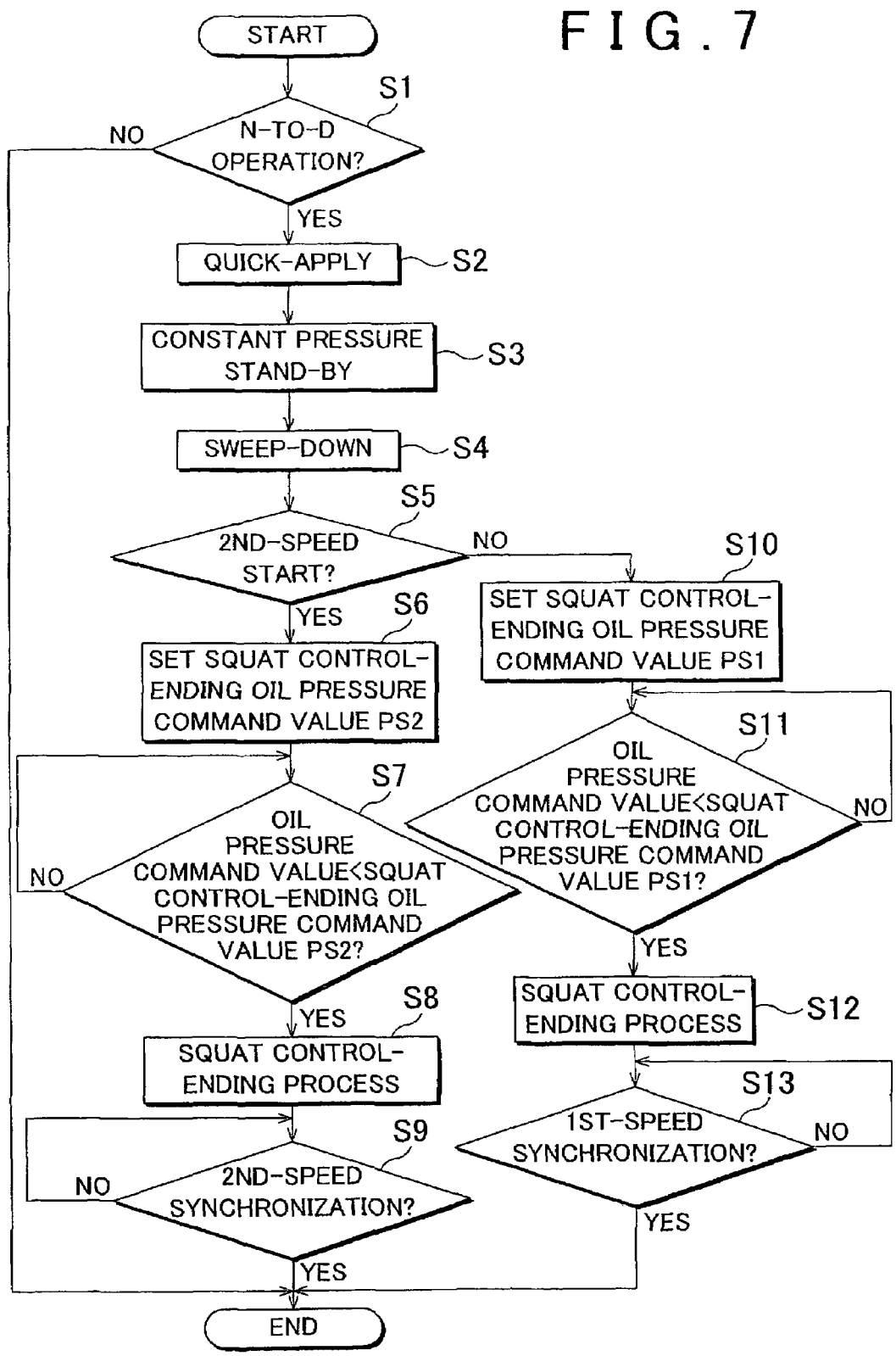
FIG. 7 is a flowchart showing a control process for a first brake performed by an electronic control unit in accordance with the embodiment of the invention.
Figure 8:
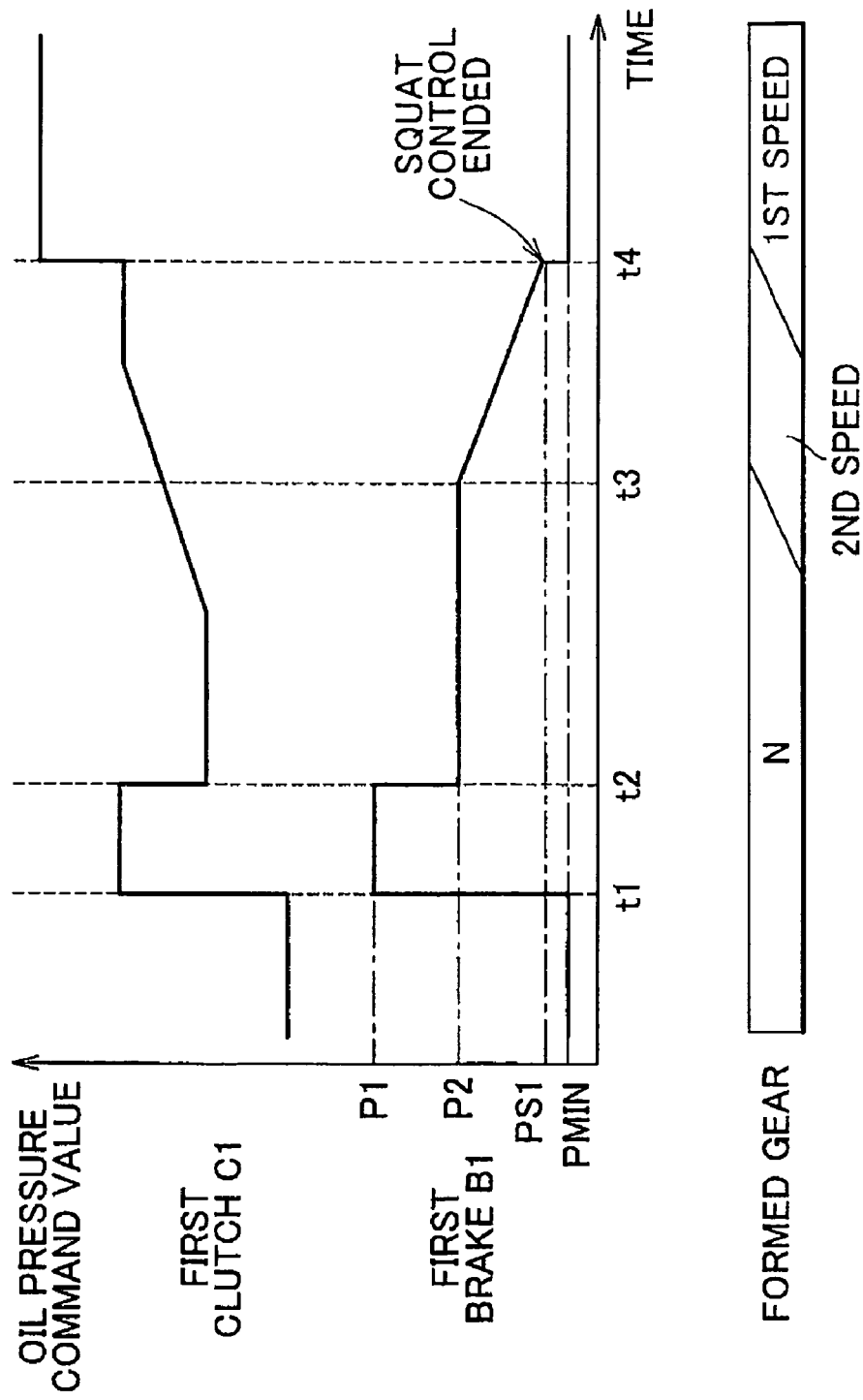
FIG. 8 is a timing chart of oil pressure command values for a first clutch and the first brake during an ordinary standing-start mode in accordance with the embodiment of the invention.
Figure 9:
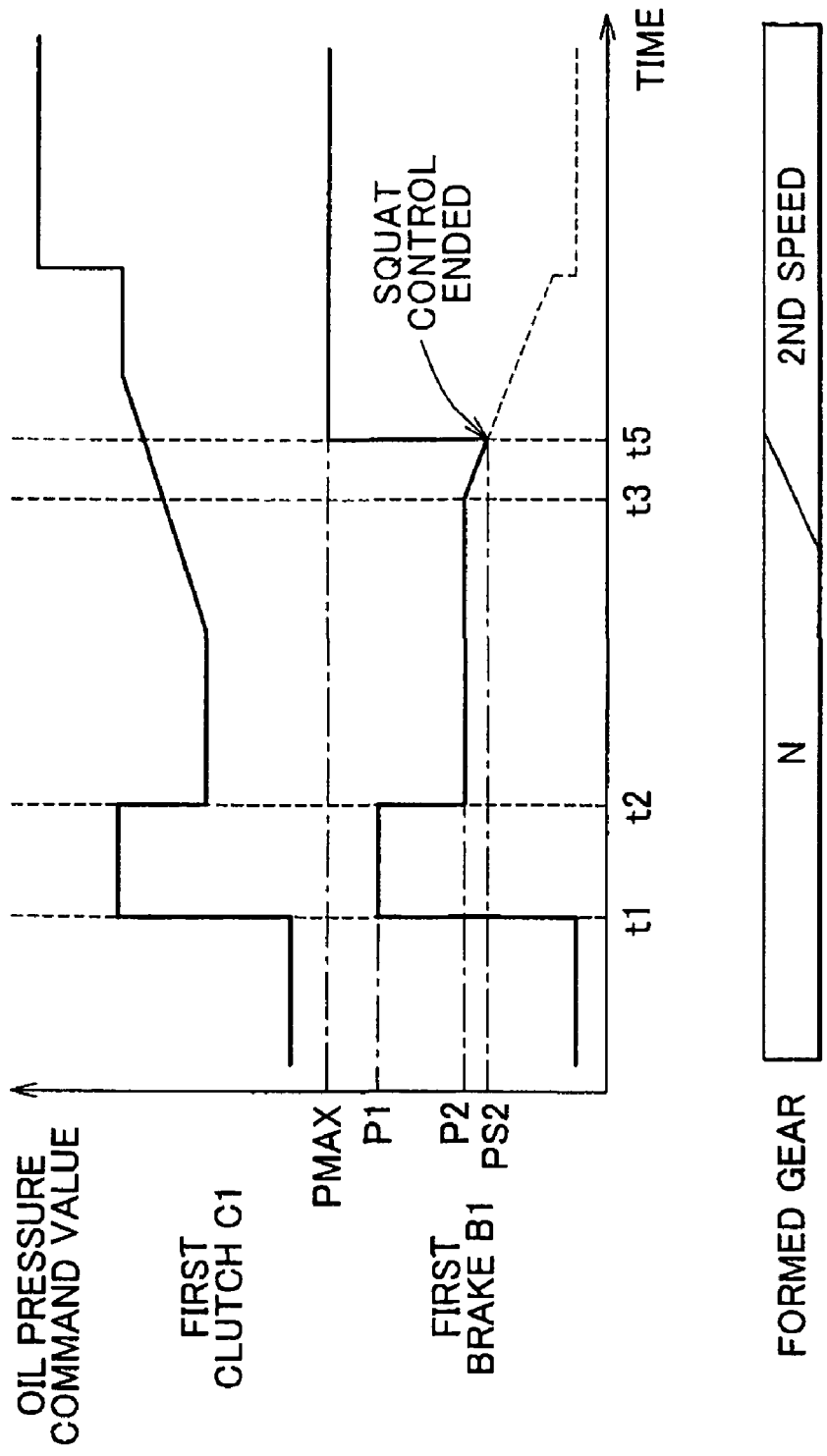
FIG. 9 is a timing chart of oil pressure command values for the first clutch and the first brake during a 2nd-speed standing-start mode in accordance with the embodiment of the invention.
Figure 10:
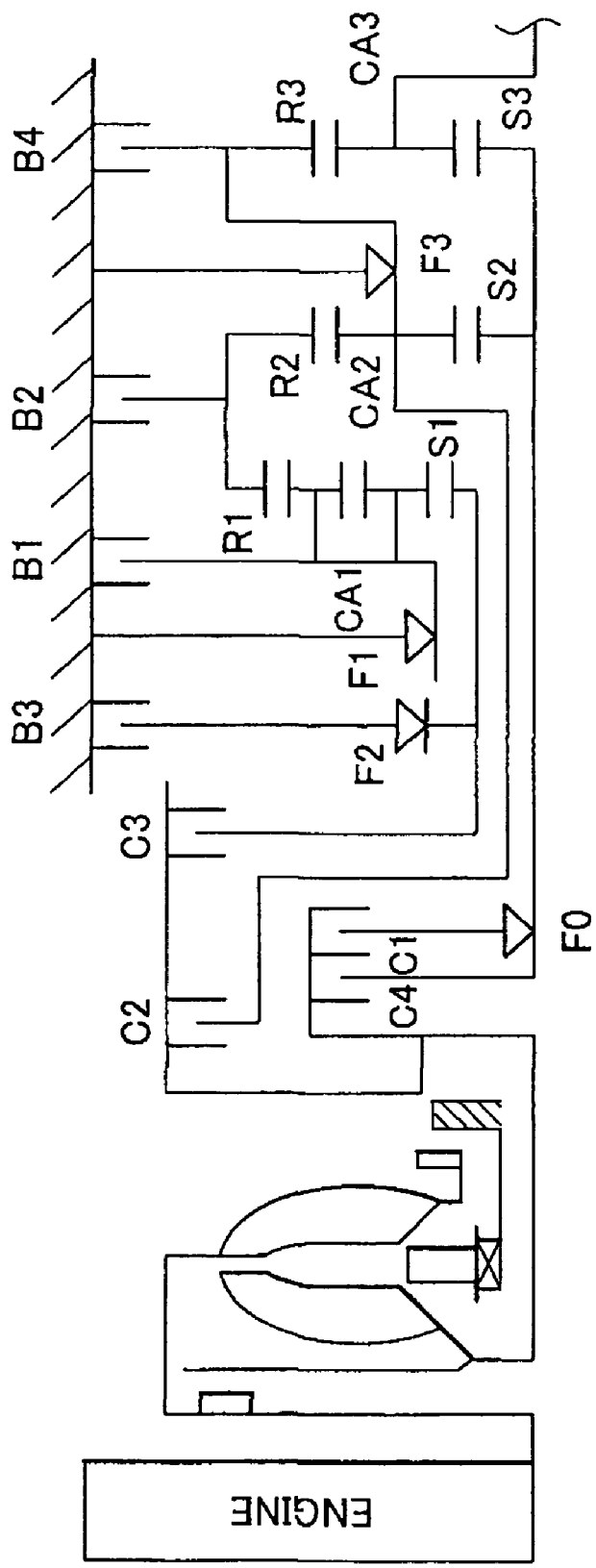
FIG. 10 is a general construction diagram of a related-art vehicle driving device.

Next, the operation will be described. FIG. 7 is a flowchart showing a control process for the first brake performed by an electronic control unit in accordance with the embodiment of the invention. FIG. 8 is a timing chart of oil pressure command values for the first clutch and the first brake during the ordinary standing-start mode in accordance with the embodiment of the invention. FIG. 9 is a timing chart of oil pressure command values for the first clutch and the first brake during the 2nd-speed standing-start mode in accordance with the embodiment of the invention. The process described below is realized by a program pre-stored in the ROM, and is executed by the CPU.

As shown in FIG. 7, the electronic control unit 13 firstly determines whether or not the shift lever 18 has been operated from the "N" position to the "D" position. More specifically, the electronic control unit 13 determines whether or not the shift lever 18 has been operated from the "N" position to the "D" position on the basis of the signal that corresponds to the lever position PSH detected by the lever position sensor 17.

If it is determined that the shift lever 18 has not been operated from the "N" position to the "D" position (if the answer to step S1 is NO), the electronic control unit 13 ends this control process.

On the other hand, if it is determined that the shift lever 18 has been operated from the "N" position to the "D" position (if the answer to step S1 is YES), the electronic control unit 13 controls the linear solenoid valve SL5 so that a quick-apply operation is executed for the first brake B1 (step S2). More specifically, the electronic control unit 13 outputs a signal representing a predetermined oil pressure command value P1 to the linear solenoid valve SL5 during a period from time t1 to time t2 shown in FIGS. 8 and 9.

Next, the electronic control unit 13 controls the linear solenoid valve SL5 so that the first brake B1 assumes a constant-pressure stand-by state at a constant stand-by pressure (step S3). More specifically, the electronic control unit 13 outputs a signal representing a predetermined oil pressure command value P2 to the linear solenoid valve SL5 during a period from time t2 to time t3 shown in FIGS. 8 and 9.

Next, the electronic control unit 13 controls the linear solenoid valve SL5 so that a sweep-down operation of gradually lowering the oil pressure acting on the first brake B1 is executed (step S4). More specifically, starting at the time t3 shown in FIGS. 8 and 9, the electronic control unit 13 gradually lessens the oil pressure command value from the predetermined oil pressure command value P2 as time elapses, and also outputs the signal representing the oil pressure command value to the linear solenoid valve SL5. Incidentally, the process of step S4 continues to be performed until a squat control-ending process (steps S8, S12) described below is started.

Next, the electronic control unit 13 determines whether or not the 2nd-speed standing-start mode for starting the vehicle from the standing state in the second speed change step has been selected (step S5). More specifically, the electronic control unit 13 determines whether or not the engine rotation speed NE detected by the engine rotation speed sensor 14 is greater than or equal to a predetermined engine rotation speed. If it is determined that the engine rotation speed NE is greater than or equal to the predetermined engine rotation speed, the electronic control unit 13 determines that the 2nd-speed standing-start mode has been selected. If it is determined that the engine rotation speed NE is not greater than or equal to the engine rotation speed, the electronic control unit 13 determines whether or not the 2nd-speed standing-start mode has not been selected, that is, determines that the ordinary standing-start mode for starting the vehicle from the standing state in the first speed change step has been selected. A reason why the electronic control unit 13 determines that the 2nd-speed standing-start mode has been selected in the case where it is determined that the engine rotation speed NE is greater than or equal to the predetermined engine rotation speed is as follows. That is, in the case where the engine rotation speed NE is high, the rear wheels become likely to spin particularly in an FR vehicle; therefore, in order to prevent the spinning, the vehicle needs to be started in the second speed change step.

If in step S5 it is determined that the 2nd-speed standing-start mode has not been selected (if the answer to step S5 is NO), the electronic control unit 13 proceeds to step S10. On the other hand, if it is determined that the 2nd-speed standing-start mode has been selected (if the answer to step S5 is YES), the electronic control unit 13 sets the squat control-ending oil pressure command value PS2 for the 2nd-speed standing-start mode (step S6). The squat control-ending oil pressure command value PS2 is large to such a degree that the first brake B1 is not released.

Next, the electronic control unit 13 determines whether or not the oil pressure command value has become less than the oil pressure command value PS2 (step S7). At this stage, the electronic control unit 13 repeatedly performs the process of step S7 until the oil pressure command value becomes less than the oil pressure command value PS2.

When it is determined that the oil pressure command value has become less than the oil pressure command value PS2 (when the answer to step S7 is YES), the electronic control unit 13 performs the squat control-ending process at time t5 shown in FIG. 9 (step S8). Specifically, the electronic control unit 13 ends the squat control before the first speed change step is formed by releasing the first brake B1, and thus retains a state in which the second speed change step has been formed. More specifically, the electronic control unit 13 outputs a signal representing an oil pressure command value PMAX to the linear solenoid valve SL5. At this time point, the first brake B1 is in an approximately engaged state, so that shock will occur even if the oil pressure command value for the first brake B1 is made larger.

Next, the electronic control unit 13 determines whether or not the synchronization for the second speed change step has been achieved (step S9). More specifically, the electronic control unit 13 determines whether or not the ratio between the turbine rotation speed NT detected by the turbine rotation speed sensor 15 and the output shaft rotation speed NOUT detected by the output shaft rotation speed sensor 16 is equal to the speed change ratio of the second speed change step. If it is determined that the ratio between the turbine rotation speed NT and the output shaft rotation speed NOUT is equal to the speed change ratio of the second speed change step, the electronic control unit 13 determines whether or not the synchronization for the second speed change step has been achieved. If it is determined that the ratio between the turbine rotation speed NT and the output shaft rotation speed NOUT is not equal to the speed change ratio of the second speed change step, the electronic control unit 13 determines that the synchronization for the second speed change step has not been achieved.

The electronic control unit 13 repeatedly executes the process of step S9 until the synchronization for the second speed change step is achieved. On the other hand, when the synchronization for the second speed change step is achieved (when the answer to step S9 is YES), the electronic control unit 13 ends this control process.

If in step S5 it is determined that the 2nd-speed standing-start mode has not been selected, the electronic control unit 13 sets a squat control-ending oil pressure command value PS1 for the ordinary standing-start mode (step S10). It is to be noted herein that the squat control-ending oil pressure command value PS1 is small to such a degree that the first brake B1 is released.

Next, the electronic control unit 13 determines whether or not the oil pressure command value has become less than the oil pressure command value PS1. The electronic control unit 13 repeatedly executes the process of step S1 until the oil pressure command value becomes less than the oil pressure command value PS1.

When it is determined that the oil pressure command value has become less than the oil pressure command value PS1 (when the answer to step S11 is YES), the electronic control unit 13 performs a squat control-ending process at time t4 shown in FIG. 8 (step S12). More specifically, the electronic control unit 13 outputs a signal representing an oil pressure command value PMIN to the linear solenoid valve SL5.

After that, the electronic control unit 13 determines whether or not the synchronization for the first speed change step has been achieved (step S13). More specifically, the electronic control unit 13 determines whether or not the ratio between the turbine rotation speed NT detected by the turbine rotation speed sensor 15 and the output shaft rotation speed NOUT detected by the output shaft rotation speed sensor 16 is equal to the speed change ratio of the first speed change step. If it is determined that the ratio between the turbine rotation speed NT and the output shaft rotation speed NOUT is equal to the speed change ratio of the first speed change step, the electronic control unit 13 determines that the synchronization for the first speed change step has been achieved. If it is determined that the ratio between the turbine rotation speed NT and the output shaft rotation speed NOUT is not equal to the speed change ratio of the first speed change step, the electronic control unit 13 determines that the synchronization for the first speed change step has not been achieved.

The electronic control unit 13 repeatedly executes the process of step S13 until the synchronization for the first speed change step is achieved. When the synchronization for the first speed change step is achieved (when the answer to step S13 is YES), the electronic control unit 13 ends this control process.

As described above, in the case where the 2nd-speed standing-start mode for the standing-start of the vehicle in the second speed change step has been selected, the electronic control unit 13 in accordance with this embodiment temporarily forms the second speed change step by engaging the first clutch C1 and the first brake B1, and then ends the squat control before the first speed change step is formed by releasing the first brake B1. Therefore, it does not happen that the speed change step changes from the second speed change step to the first speed change step and then back to the second speed change step. Instead, the state in which the second speed change step is first formed can be retained. Therefore, even when the vehicle is started from the standing state in the second speed change step, the occurrence of a speed change step shift shock can be prevented.

Besides, the electronic control unit 13 in accordance with the embodiment temporarily forms the second speed change step by engaging the first clutch C1 and the first brake B1, and then gradually lessens the oil pressure command value for the first brake B1, and ends the squat control when the oil pressure command value becomes less than the squat control-ending oil pressure command value PS2. Therefore, the timing of ending the squat control can be minutely set.

Besides, in accordance with the embodiment, in the case where the 2nd-speed standing-start mode has not been selected, that is, where the ordinary standing-start mode has been selected, the electronic control unit 13 ends the squat control when the oil pressure command value for the first brake B1 becomes less than the squat control-ending oil pressure command value PS1. Therefore, the squat control can be performed separately for the time of the 2nd-speed standing-start and the time of the ordinary standing-start.

Besides, in accordance with the embodiment, in the case where the 2nd-speed standing-start mode has been selected, the electronic control unit 13 is able to end the squat control while the oil pressure of the first brake B1 remains high.

Therefore, the speed change step shift shock associated with the release and re-engagement of the first brake B1 can be prevented.

Besides, although the electronic control unit 13 in accordance with the embodiment determines in step S1 whether or not the step S1 has been operated from the "N" position to the "D" position, this is not restrictive. It may also be determined whether or not the shift lever 18 has been operated from the "P" position to the "D" position.

Besides, although the electronic control unit 13 in accordance with the embodiment determines whether or not the 2nd-speed standing-start mode for the standing-start of the vehicle in the second speed change step has been selected, by determining whether or not the engine rotation speed NE detected by the engine rotation speed sensor 14 is greater than or equal to the predetermined engine rotation speed, this is not restrictive.

For example, the electronic control unit 13 may also determine whether or not the 2nd-speed standing-start mode has been selected, by determining whether or not the vehicle is on a low-μ road whose road surface friction co-efficient is low. Incidentally, the electronic control unit 13 determines whether or not the vehicle is on a low-μ road by calculating a slip rate of each wheel on the basis of the vehicle speed and the right and left-side wheel speeds and determining whether or not the slip rate of each wheel obtained through the calculation is greater than or equal to a predetermined slip rate.

Besides, the electronic control unit 13 may also determine whether or not the 2nd-speed standing-start mode has been selected, by determining whether or not a snow mode switch (not shown) has been depressed.

Besides, although the electronic control unit 13 in accordance with the embodiment determines whether or not the synchronization for the second speed change step has been achieved by determining whether or not the ratio between the turbine rotation speed NT detected by the turbine rotation speed sensor 15 and the output shaft rotation speed NOUT detected by the output shaft rotation speed sensor 16 is equal to the speed change ratio of the second speed change step, this is not restrictive. For example, the electronic control unit 13 may also determine whether or not the synchronization for the second speed change step has been achieved, on the basis of the oil pressure command value PMAX that is provided for the first brake B1 at the end of the squat control, and the elapsed time from the output of the signal representing the oil pressure command value PMAX to the linear solenoid valve SL5.

Besides, although the electronic control unit 13 in accordance with the embodiment determines whether or not the synchronization for the first speed change step has been achieved by determining whether the ratio between the turbine rotation speed NT detected by the turbine rotation speed sensor 15 and the output shaft rotation speed NOUT detected by the output shaft rotation speed sensor 16 is equal to the speed change ratio of the first speed change step, this is not restrictive. For example, the electronic control unit 13 may also determine whether or not the synchronization for the first speed change step has been achieved on the basis of the oil pressure command value PMIN provided for the first brake B1 at the end of the squat control, and the elapsed time from the output of a signal representing the oil pressure command value PMIN to the linear solenoid valve SL5.

As described above, the shift control device for an automatic transmission in accordance with the invention has an advantageous effect of being able to prevent the occurrence of a speed change step shift shock even in the case where the vehicle is to be started in a higher-speed step that is smaller in speed change ratio than the first speed change step, and is therefore useful for the shift control device for the automatic transmission that executes the squat control.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A shift control device for an automatic transmission, comprising:
    a squat control device that, when a shift range is switched from a non-travel range to a travel range, performs a squat control of temporarily forming a high-speed step that is smaller in speed change ratio than a first speed change step by engaging a first engagement element and a second engagement element, and then forming the first speed change step by releasing the second engagement element; and
    a squat control end device that, in a case of standing-start of a vehicle in the high-speed step, ends the squat control performed by the squat control device, before the first speed change step is formed by releasing the second engagement element.

2. The shift control device according to claim 1, further comprising a high-speed step standing-start-time setting device that sets an oil pressure command value that serves as a squat control-ending condition in the case of standing-start of the vehicle in the high-speed step, wherein:
    the squat control device gradually lessens an oil pressure command value for the second engagement element after the high-speed step is temporarily formed by engaging the first engagement element and the second engagement element; and
    in the case of standing-start of the vehicle in the high-speed step, the squat control end device ends the squat control performed by the squat control device when the oil pressure command value for the second engagement element that is gradually lessened by the squat control device becomes less than the oil pressure command value set by the high-speed step standing-start-time setting device.

3. The shift control device according to claim 2, further comprising
    an ordinary standing-start-time setting device that sets an oil pressure command value that serves as a squat control-ending condition in the case of standing-start of the vehicle in the first speed change step, wherein
    in the case of standing-start of the vehicle in the first speed change step, the squat control end device ends the squat control performed by the squat control device when the oil pressure command value for the second engagement element that is gradually lessened by the squat control device becomes less than the oil pressure command value set by the ordinary standing-start-time setting device.

4. The shift control device according to claim 3, wherein the oil pressure command value set by the high-speed step standing-start-time setting device is larger than the oil pressure command value set by the ordinary standing-start-time setting device.

* * * * *